United States Patent [19]
Olive

[11] Patent Number: 5,412,796
[45] Date of Patent: May 2, 1995

[54] METHOD AND APPARATUS FOR GENERATING IMAGES SIMULATING NON-HOMOGENEOUS FOG EFFECTS

[75] Inventor: Graham J. Olive, Burgess Hill, England

[73] Assignee: Rediffusion Simulation Limited, Sussex, United Kingdom

[21] Appl. No.: 915,999
[22] PCT Filed: Apr. 22, 1991
[86] PCT No.: PCT/GB91/00627
   § 371 Date: Aug. 3, 1992
   § 102(e) Date: Aug. 3, 1992
[87] PCT Pub. No.: WO91/18359
   PCT Pub. Date: Nov. 28, 1991

[30] Foreign Application Priority Data
May 12, 1990 [GB] United Kingdom ............... 9010703
Jun. 1, 1990 [GB] United Kingdom ............... 9012229

[51] Int. Cl.⁶ .................................................. G09B 9/08
[52] U.S. Cl. ................................... 395/500; 434/36; 434/38
[58] Field of Search ............... 395/500, 126, 127; 434/34–43; 364/578, 525

[56] References Cited
U.S. PATENT DOCUMENTS

| | | | |
|---|---|---|---|
| 3,436,840 | 4/1969 | Noxon | 434/36 |
| 3,548,515 | 12/1970 | Simon | 434/36 |
| 3,650,627 | 3/1972 | Noxon | 356/4 |
| 3,675,344 | 7/1972 | Williams | 434/36 |
| 3,746,778 | 7/1973 | Peters | 348/578 |
| 3,784,720 | 1/1974 | Oliphant | 434/41 |
| 4,016,658 | 4/1977 | Porter et al. | 434/41 |
| 4,199,875 | 4/1980 | Barbarasch | 434/41 |
| 4,313,726 | 2/1982 | Chase | 434/42 |
| 4,672,564 | 6/1987 | Egli et al. | 364/559 |
| 4,714,428 | 12/1987 | Bunker et al. | 434/43 |

OTHER PUBLICATIONS

"Shading Models for Realistic Image Synthetic", Knox IEEE Sep. 1989, pp. 595–603.
"Synthetic Imagery to Simulate Camouflage Effectiveness" Chance, IEEE Sep. 1989, pp. 2098–2102.
"Computer Graphics: Principles and Practice", Foley et al., Addison Wesley, 1990, pp. 701–705, 1060–1061, 1094–1100.

*Primary Examiner*—Parshotam S. Lall
*Assistant Examiner*—Viet Vu
*Attorney, Agent, or Firm*—Nixon & Vanderhye

[57] ABSTRACT

A method and apparatus for simulating the effect of non-homogeneous fog in an image displayed on a screen. The image is intended to represent the appearance of a model defined in a database in world space coordinates from an eyepoint position in world space, the model being defined in terms of individual features each having predetermined attributes defining the position and visible characteristics of the feature. Image data is derived from the model for each of an array of sampling points distributed across screen space. A non-homogeneous fog structure is defined in world space coordinates as a series of parallel strata of predetermined extinction coefficients. The positions of the eyepoint and a feature to be displayed relative to the fog structure are determined. The distance from the feature to the eyepoint is calculated. An average value of the extinction coefficients between the eyepoint and the feature is calculated from the defined parallel strata, and the attributes are modulated as a function of the calculated distance and the calculated average value of the extinction coefficients.

3 Claims, 7 Drawing Sheets

METHOD AND APPARATUS FOR GENERATING IMAGES SIMULATING NON-HOMOGENEOUS FOG EFFECTS

BACKGROUND OF THE INVENTION

1. Field of the Invention

The present invention relates to an image generator, and in particular to a computer image generator suitable for generating information in real time from which an image can be derived for display in for example a flight simulator.

2. Related Art

Real time image generators for flight simulators are used to simulate images which are presented to pilots who are positioned in a mock aircraft cockpit. The intended viewer of the image produced by the system, that is the simulator "pilot", looks out through an imaginary window into a three-dimensional (3-D) world defined by information stored as geometrical and other characteristic attribute data in a main database. A line drawn from the eyepoint through the window intersects a point in the 3-D world. The colour and intensity of that point must be "painted" on the window at the point of intersection of that line with the window.

The displayed image is made up from a series of picture elements (pixels) each of which is of uniform colour and intensity, the colour and intensity of each pixel being a function of the position of the eyepoint relative to the 3-D world which the stored data represents. In a real time display where hundreds of thousands of pixels must be updated sufficiently quickly to avoid jumping of the image, it is necessary to perform many millions of calculations per second to maintain image fidelity.

The position of the eyepoint relative to the database changes over time in response to the manipulation of the flight controls of the simulated aircraft. At any point in time the simulator produces an output indicating the eyepoint position in world space coordinates, that is the coordinate system of the database, and indicating the viewing direction, that is a vector drawn from the pilot's eyepoint through the centre of the viewing window. The database stores data indentifying the position and orientation of a large number of features that may contribute to the final image. The image generator calculates which of the features is visible for the given eyepoint, the position of the boundaries of the features relative to the viewing window, and the attributes such as colour and intensity of the visible features. Occulation of one feature by another must be taken into account, and in high quality systems the effects of one translucent feature occulting another must also be taken into account.

The content of the database is used to derive the colour and intensity information for each pixel of the image to be displayed on a screen placed in front of the simulator pilot. The centre of each pixel is on a unique predetermined imaginary viewing line extending from the eyepoint to the screen and notionally extending through the screen onto the surface of the model defined in the database. This means that the world space coordinate system of the database must be transformed using the eyepoint coordinates into a coordinate system having the eyepoint as its origin, that is an eyepoint space coordinate system, and the information must then be transformed from eyepoint space into a screen space coordinate system. The screen space coordinate system is two dimensional, having its origin at the centre of the display screen. These transformations enable the surface areas of the modelled features which determine the colour and intensity of each pixel (for which the screen space coordinates are known) to be determined. Once the features contributing to a particular pixel have been identified, the colour, intensity and other attributes of those features can be obtained from the database and appropriate calculations performed to determine the final displayed colour and intensity of the pixel.

If a high quality image is to be achieved, the final pixel colour and intensity must be based on a number of samples of the contributing features taken at sampling points distributed across each pixel. For each feature making a contribution to an image it is necessary to determine whether or not that feature overlaps each point in screen space corresponding to a sampling point.

In most known CIG systems, the world space model is defined as a series of polygonal features. Light point features can also be displayed in some systems. In the case of polygonal features, each polygon is described in the database by the world space coordinates of at least its vertices, and these geometrical attributes must be transformed into screen space coordinates to take account of the position and orientation of the eyepoint. This involves an initial world space to viewpoint space transformation, followed by a viewpoint space to screen space transformation. The transformations are computationally intensive operations but do enable realistic images to be displayed. In the case of a light point feature, it may be described in the database by for example a position (coordinate of the light point centre) in world space. The position is transformed to screen space, and the feature can then be displayed on a circular area of the screen centred on the transformed position and having a radius which is a function of range, that is distance from the eyepoint.

CIG systems are known which can simulate the visual effects of homogeneous fog, that is fog with a constant density occupying all of the space between the eyepoint and the model. Fog effects may be described in terms of sigma, sometimes referred to as the "extinction coefficient". The transmittance of fog (Tfog) may be represented as:

$$Tfog = e^{-sr}$$

where:
  s is sigma
  r is the length of the transmission path through the fog
  e is 2.71828

Thus the transmittance Tfog is the luminous flux remaining after light has traversed an optical path of length r and extinction coefficient s. The transmittance of fog could be modelled by an equation other than that set out above, but in all cases it will be necessary to include a term which represents the fog density and a term which represents the length of the transmission path through the fog. The term which represents the fog density will be referred to herein as the extinction coefficient or sigma.

Thus in a CIG system capable of simulating homogeneous fog, the attributes of a feature at a sampling point are modulated by a fog transmittance factor which is a function of the extinction coefficient and the optical path length. The CIG system then sums the fog modulated effects of all sampling points contributing to a pixel using conventional summing techniques. Homogeneous fog simulation does impose an increased computational load on the system, but the increased load is not very large, particularly in systems where feature range is already available, as essentially all that is required is a calculation of Tfog plus a simple modulation of the derived feature attributes by Tfog.

Thus known CIG systems can simulate the effects of homogeneous fog. Unfortunately, in the real world, fog is rarely homogeneous, and the non-homogeneity of fog provides readily apparent and useful visible cues. For example, fog tends to accumulate in horizontal formations in valleys or over low-lying areas, producing strong visual cues. As a further example, fog can be "patchy" so that irregular fog formations can be distributed along the length of a runway. The simulation of the passage of an aircraft through such formations produces very strong visual cues indeed.

It is known to try to simulate the visible effects of non-homogeneous fog by varying the instantaneous homogeneous fog extinction coefficient. For example, the extinction coefficient could be a function of eyepoint altitude, or some other variable. Such an approach has proved to be unsatisfactory however as it results in false cues.

It would be theoretically possible to model non-homogeneous fog as a series of translucent features and to process those features in a conventional manner. Unfortunately it would require a very large number of "fog features" if false cues were to be avoided. For example, passage of a simulated aircraft through one "fog feature" would result in the sudden disappearance of the fog represented by that feature. This would be visually apparent unless a fog formation is made up from a large number of closely adjacent features so that the disappearance of one those features is not visually apparent. In practice, fog cannot be simulated by individual features in real time systems without imposing an unacceptable computational load. Furthermore, detailed modelling of fog formations using a large number of individual translucent fog features would add large costs to model database production.

BRIEF SUMMARY OF THE INVENTION

It is an object of the present invention to obviate or mitigate the problems outlined above.

According to the present invention there is provided a method for simulating the effects of non-homogeneous fog in an image displayed on a screen, the image being intended to represent the appearance of a model defined in a database in world space coordinates from an eyepoint position in world space, and the model being defined in terms of a plurality of features each having predetermined attributes, wherein a. a non homogeneous fog structure is defined in world space coordinates as a series of parallel strata of predetermined extinction coefficient, b. the position relative to the defined parallel strata of the eyepoint is determined, c. the position relative to the defined parallel strata of a feature which may contribute to the image is determined, d. the distance from the eyepoint of the feature is determined, e. an average value of the extinction coefficient between the eyepoint and the feature is calculated from the defined parallel strata located between the eyepoint and the feature, and f. the said attributes are modulated as a function of the calculated distance and the calculated average value of the extinction coefficient.

Preferably, the position of the eyepoint relative to the defined parallel strata is determined from the dot product of a vector representing the direction from the eyepoint to an origin of the parallel strata and a vector representing an axis perpendicular to the parallel strata.

Preferably the average value of the extinction coefficient between the eyepoint and the feature is calculated by calculating and storing average extinction coefficient values for each of a series of distances from the eyepoint in a direction perpendicular to the parallel strata, calculating the distance from the eyepoint of the feature in the direction perpendicular to the parallel strata, and locking up the stored average extinction coefficient corresponding to the calculated eyepoint to feature distance.

The non-homogeneous fog structure may be defined by a series of sample extinction coefficients each corresponding to the extinction coefficient at a respective one of a series of parallel equally spaced sample planes, the non-homogeneous fog structure is redifined with reference to the eyepoint by a series of average extinction coefficients each corresponding to the average extinction coefficient between the eyepoint and a respective resample plane, the resample planes being parallel to and equally spaced to the said sample planes and one of the resample planes passing through the eyepoint, and each resampled average extinction coefficient is stored at an address corresponding to the distance from the eyepoint of the resample plane to which that coefficient is related.

Preferably, average extinction coefficients are looked up corresponding to two resample planes between which the feature is located, and a further average extinction coefficient is calculated by interpolating the looked-up coefficients with reference to the position of the feature relative to the said two resample planes.

Screen space may be divided into a plurality of cells each covering a plurality of pixels, for each feature the addresses of the resample planes are calculated for points defined as the intersections between lines drawn from the eyepoint through the corners of the cells and a plane defined by the feature, and resample plane addresses for each of a series of sampling points on or areas of the feature are calculated by interpolation from the cell corner resample plane addresses.

The invention also provides an apparatus for simulating the effects of non-homogeneous fog in an image displayed on a screen, the image being intended to represent the appearance of a model defined in a database in world space coordinates from an eyepoint position in world space, and a model being defined in terms of a plurality of features each having predetermined attributes, comprising a. means for defining a non-homogeneous fog structure in world space coordinates as a series of parallel strata of predetermined extinction coefficients, b. means for determining the position relative to the defined parallel strata of the eyepoint, c. means for determining the position relative to the defined parallel strata of a feature which may contribute to the image, d. means for calculating the distance from the eyepoint to the feature, e. means for calculating an average value of the extinction coefficient between the eyepoint and the feature from the defined parallel strata located between the eyepoint and the feature, and f. means for modulating the said attributes as a function of the calculated distance and the calculated average value of the extinction coefficient.

The advantage of the present invention is that it provides the capacity to simulate non-homogeneous fog effects in a very realistic manner without imposing unacceptable computational loads on the image generator. For example, fog pockets in valleys or other low-lying areas can be simulated by horizontal strata the altitude of which is such that they do not appear except within low-lying areas. Patchy fog spaced apart along the runway can be simulated by vertical strata. Cloud strata through which mountains penetrate can realistically and economically be simulated. Thus a variety of effects can be achieved in an economical manner.

BRIEF DESCRIPTION OF THE DRAWINGS

An embodiment of the present invention will now be described, by way of example, with reference to the accompanying drawings, in which.

DETAILED DESCRIPTION OF EXEMPLARY EMBODIMENTS

Figure 1:
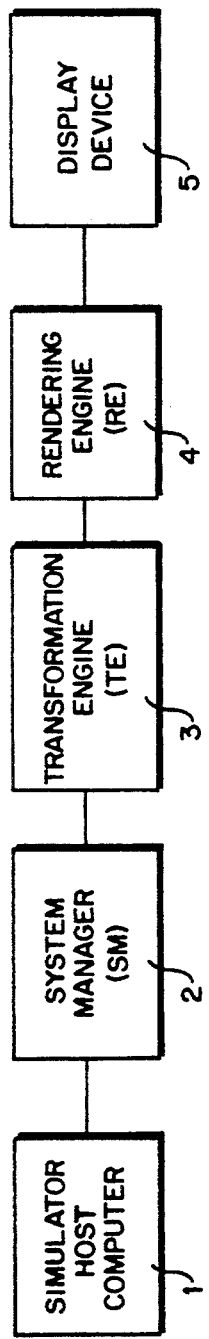
FIG. 1 is a schematic illustration of the basic configuration of a CIG system in accordance with the present invention.

Referring to FIG. 1, this illustrates the basic functional components of an embodiment of the present invention adapted for use in a flight simulator. The simulator incorporates a host computer 1 which provides outputs corresponding to the position and attitude of the simulated aircraft relative to a world space model of the earth surface. An image is to be displayed which is representative of the appearance of the model surface to an observer in the simulated aircraft. In the described embodiment, the image is projected onto a back projection screen. The observer views the reflection of the back projection screen in a large spheroidal mirror. It will be appreciated however that alternative display systems may be used.

A system manager (SM) 2 receives the outputs of the host computer 1 describing the aircraft position and attitude and downloads from a database model-describing data corresponding to those portions of the model which are potentially visible from the observer's eyepoint given the position and attitude of the simulated aircraft. The image is projected as a plurality of raster scanlines. Calligraphic light points could be superimposed on the image raster using conventional techniques.

The model-describing data is predetermined during model production but will describe features of the modelled scene, for example runways, buildings and fields, in terms related to a set of world space coordinates with a predetermined origin. The model may include a variety of different feature types, for example straight edged polygonal features, and circular light points. The model describing data is hierarchically ordered such that most individual features of the model are defined by reference to objects of which they form a part, and those objects are in turn defined by reference to other objects in the model. Thus the model world will generally define a feature in "object space", that is with reference to a coordinate system having its origin and axes related to an object such as a building. The coordinate system of that object is then referenced to world space coordinates either directly or through one or more further objects. The term "world space coordinates" is used herein to include both direct reference to the coordinate system of the main database and indirect reference to the coordinate system of the main database through one or more "object spaces".

The extracted model-describing data is passed to a transformation engine (TE) 3 which performs two main functions, that is geometric transformation of model feature data from the database or world space coordinate system to the observers or eyepoint coordinate system, and perspective transformation from the 3-D eyepoint coordinate system to a 2-D screen space coordinate system. The techniques used to achieve such transformations are well known and accordingly are not elaborated in detail here.

The TE 3 provides a stream of model-describing data in screen coordinates to a rendering engine (RE) 4. The RE 4 performs a number of functions using model feature geometric attribute data (e.g. size and position) and model feature non-geometrical attribute data (e.g. colour, translucency) received from the TE 3 to produce a final colour for each pixel of the image to be displayed. Data representing the non-geometrical attribute data is loaded into a frame store within the RE 4, the frame store having a storage address in respect of each pixel in the final display. The contents of the frame store are down loaded to display device 5 which produces the final image. The system thus has four main pipeline stages; such that as one image frame is being displayed, the next frame to be displayed is being rendered in the RE 4, the next but one frame to be displayed is being processed in the TE 3, and the next but two frame to be displayed is being processed in the SM 2. Each stage is separated from the or each adjacent stage by a double buffered store. A frame swap signal is generated to cause all the double buffered stores to swap in unison. Thus data relevant to one frame is effectively "clocked" through the pipeline by the frame swap signal.

Figure 2:
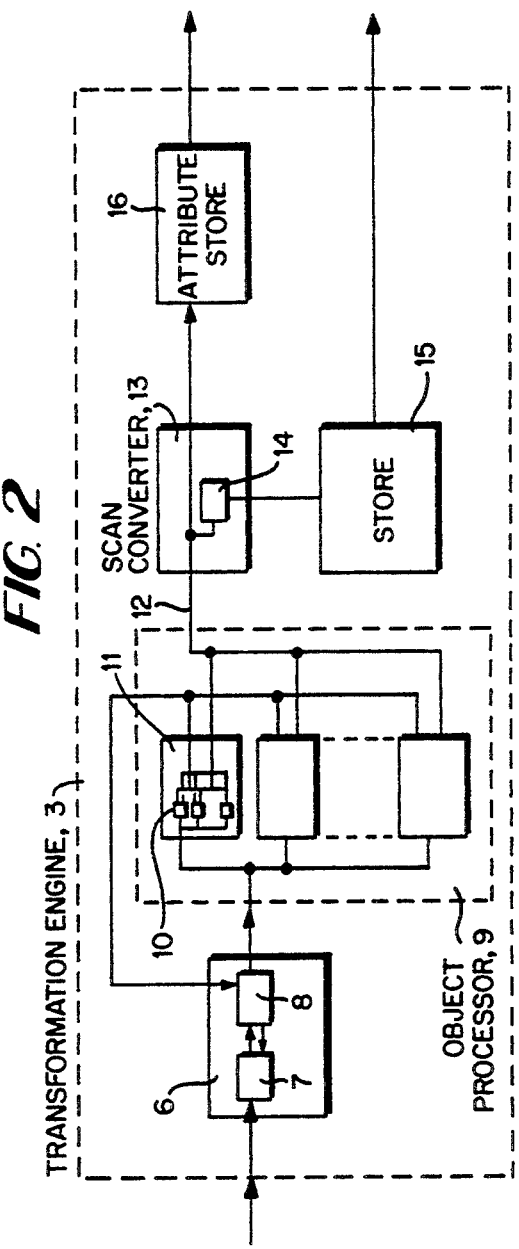
FIG. 2 is a schematic illustration of a transformation engine suitable for use in a system of the type illustrated generally in FIG. 1.

FIG. 2 illustrates the TE 3 of FIG. 1 in more detail. The TE processes data previously read out from the SM 2 into a channel active database (CADB) 6. The contents of the CADB 6 corresponds to all the data within the main database which is within potentially visible range of the eyepoint. The CADB 6 comprises a memory 7 and control logic 8 which controls the read out data from the memory to an array of object processors 9 that in turn provides control inputs to the control logic 8. The memory 7 holds the entire active database and the control logic 8 selects object data for processing. The object processor array 9 comprises individual object processors 10 arranged in groups on respective boards 11. These processors form the main computational element of the TE 3.

A common output 12 of the object processor array 9 is delivered to a scan converter 13 incorporating a logic unit 14 providing an output to a scan converter store 15. An attribute store 16 receives input via the scan converter 13. The stores 15 and 16 provide the outputs of the TE 3 to the rendering engine RE 4.

The object processors 10 perform a variety of functions, including controlling the distribution of data to the object processors in an efficient manner, performing a range cull to discard all objects which are at a range too great for them to be visible from the eyepoint, and performing a field of view cull to discard all objects which are completely outside the field of view given by the position of the viewing window or screen relative to the eyepoint. For all features not culled in this processing, the geometrical attributes must be processed. This processing includes a series of basic procedures, such as backface removal (culling all features that cannot be seen from the eyepoint as they face away from the eyepoint), plane equation attribute calculation (using the coefficients of the plane in eyepoint space of each feature that is potentially visible), and field of view culling (culling all features which are completely outside the field of view represented by the viewing window). These procedures are not directly relevant to the present invention and therefore will not be described in detail herein. The object processors 10 do transform data required for simulation of non-homogeneous fog and this is described in detail below.

Subdivision of Display Screen

Figure 3:
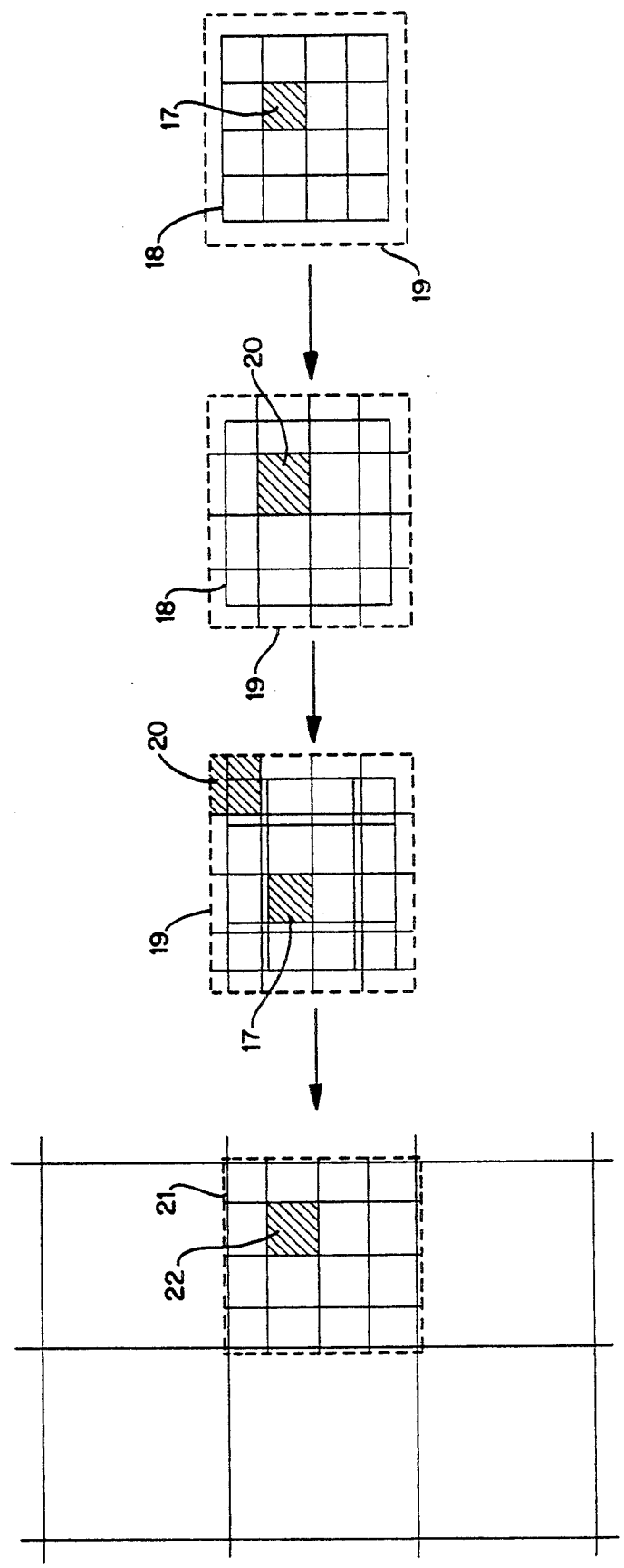
FIG. 3 illustrates the inter-relationship between various sub-areas of screen space in the embodiment of the present invention.

The displayed image is made up from a regular array of pixels which do not overlap and which together cover all of the screen. Each pixel is projected by the raster scan display device as an area of uniform colour and intensity. FIG. 3 includes four illustrations of various subdivisions of the screen, the leftmost illustration being to one quarter of the scale of the three other illustrations.

In FIG. 3, the shaded areas identified by reference numeral 17 each correspond to one pixel. The screen is divided into sub-areas or cells each covering a respective rectangular array of pixels, in the illustrated case a four by four array. Numeral 18 in FIG. 3 points to the boundary of one cell. Adjacent cells do not overlap. Superimposed on each cell is a pseudocell which covers the respective cell and a half pixel boundary around that cell. Broken lines 19 in FIG. 3 correspond to a pseudocell boundary. Thus adjacent pseudocells overlap each other. Each pseudocell is divided into a regular array of abutting pseudopixels, e.g. a four by four array of pseudopixels. The shaded areas 20 in FIG. 3 each correspond to one pseudopixel. Superimposed on the pseudocells are supercells, each covering a respective rectangular array of pseudocells, e.g. a four by four array of pseudocells in the illustrated case. Thus adjacent supercells overlap each other. The broken line 21 indicates a supercell boundary, and shaded area 22 one pseudocell within that supercell. Thus each supercell covers sixteen pseudocells, and those sixteen pseudocells together cover sixteen cells plus a half pixel wide boundary around the edge of those sixteen cells. It is necessary for adjacent supercells, adjacent pseudocells and adjacent pseudopixels to overlap to achieve anti-liaising.

For the illustrated case of a four by four pixel cell, and a four by four pseudocell supercell, and assuming a display area of 1024 by 1024 pixels, there are 64×64 supercells and 256×256 pseudocells.

Scan Converter

For each feature delivered to the scan converter (FIG. 2) by the object processors, the scan converter identifies all of the supercells which are at least partially overlapped by that feature. The scan converter assigns an identity (ID) to each feature, locates the supercells impacted by that feature, and passes the feature ID to the scan converter store 15 (hereinafter referred to as the supercell store).

The Rendering Engine

Figure 4:
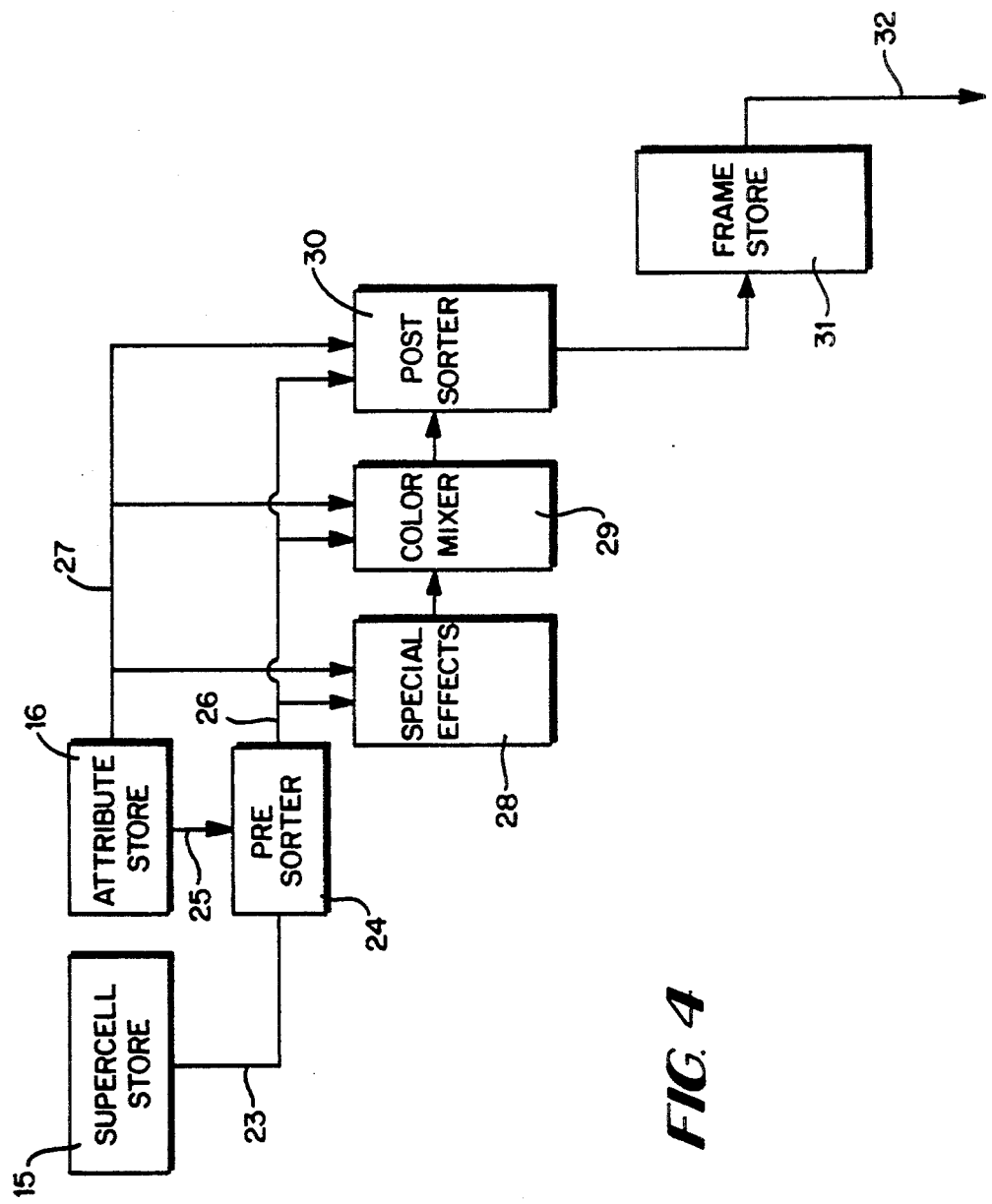
FIG. 4 is a schematic illustration of basic components of the rendering engine described in outline with reference to FIG. 1.

The RE 4 of FIG. 1 will now be described in outline with reference to FIG. 4. FIG. 4 shows the supercell store 15 and attribute store 16 of FIG. 2. It will be recalled that the supercell store and attribute store are both double-buffered, the contents of the stores being read out in response to receipt of a start of frame signal. The content of the supercell store is read out on output 23 supercell by supercell into a presorter 24 which also receives geometrical attribute data from the attribute store 16 on output 25. The presorter and attribute store provide respective outputs 26 and 27 to a special effects module 28, a colour mixer 29, and a postsorter 30. The postsorter 30 feeds raster image data to a frame store 31 and an output 32 from the frame store is delivered to the display device (display device 5 of FIG. 1).

The function of the presorter 24 is to subdivide each supercell into a series of pseudocells, to compute the effective depth (distance from the eyepoint) of each feature at each pseudocell corner, to detect any feature which is opaque and fully covers a pseudocell, and to discard any features from consideration in respect of any one pseudocell if such features lie behind an opaque feature fully covering that pseudocell. Thus given a pseudocell size which is four by four display pixels plus a half pixel boundary, each supercell ID list will be considered for each of sixteen pseudocells in turn.

The IDs accumulated in the supercell store 15 are downloaded to the presorter 24 one stack at a time. Corresponding attributes are simultaneously downloaded to the presorter from the attribute store 16. Thus the presorter receives the contents of one stack, corresponding to one supercell, and processes the features identified by the stack contents, before the next stack is downloaded.

If the presorter indicates that a feature impacts (at least partially covers) the pseudocell being processed, a "fragment" data packet is generated and applied to the fragment carrying output bus 26. This data packet comprises only the screen space coordinates of the four corners of the relevant pseudocell and the impacting feature ID. The fragments of features thus identified are then processed in the special effects module 28, the colour mixer 29, and the postsorter 30.

The units 28 to 30 operate on the basis of pseudopixels. In the illustrated case sixteen pseudopixels fully cover (but do not extend beyond) a respective pseudocell. The corners of the pseudopixels are interpolated from the corners of the relevant pseudocell carried by the fragment bus. As described in more detail below, the special effects module 28 generates, for each pseudopixel of the pseudocell being processed, an output appropriate to the simulation of fog effects. The special effects module may also produce outputs appropriate to any other special effects the attributes of the feature being processed demand, e.g. texture effects or landing light effects. The special effect outputs are applied to the colour mixer 29 where further effects such as ambient lighting are processed, the colour mixer delivering an RGBT (red, green, blue, translucency) output for each pseudopixel to the postsorter 30. The postsorter provides an output to the frame store 31. The frame store provides output 32 to the raster display device 5 (FIG. 1).

The function of the postsorter 30 is to resolve the effects of surfaces hiding or partially hiding other surfaces. It does this by assessing the impact of features on an array of sampling points, accumulating and weighting the effects of such impacts, and providing a final RGB output for each display pixel to the frame store. Each pseudopixel fragment received by the postsorter covers a respective array of sampling points distributed across the pixel array corresponding to each pseudocell. Typically there may be two hundred sampling points, that is eight per pixel. (It will be recalled that each pseudocell in the described example covers a four by four pixel array plus a half pixel wide boundary). The position of every sampling point relative to the four by four pseudopixel array defined for each pseudocell is known, and therefore it is necessary to decide, for each sampling point, whether or not a feature impacts that point, and only if impact is detected to accumulate the RGBT inputs to the postsorter from the corresponding pseudopixel.

Each sampling point may be overlapped by a large number of features and it is necessary to depth sort those features to discard those which are fully occulted by nearer (to the eyepoint) opaque features at that sampling point. To this end, the distance (from the eyepoint) of each feature at each sampling point is calculated. The RGBT and depth of the first feature impacting a sampling point is loaded into a respective store. Subsequent features are depth compared with the first stored feature, features being discarded from the store (or not entered) except for the current nearest opaque feature and translucent features nearer than the nearest opaque feature. Once all the features potentially relevant to a cell have been so processed, the cumulative effects of all the features identified in each stack are calculated to produce a final RGB output for each sampling point. Those outputs are then weighted and accumulated to produce a single RGB for each pixel. Each pixel will respond to contributions from the eight sampling points within its own boundary and sampling points within a half pixel wide border therearound, that is thirty-two sampling points in all $(1 \times 8 + 4 \times 4 + 4 \times 2)$. The total area covering the thirty-two sampling points is thus equal to the area of a two by two pixel array but is centred on the centre of one display pixel.

The attribute store 16, supercell store 15, and frame store 53 are all double-buffered so as to define the boundaries between separate stages in the pipe-lined system.

The system described and outlined above is of a type to which the present invention may be applied, although it will be appreciated that the present invention may be applied in systems having a different general structure. In the system described above, the present invention is implemented within the special effects module and the colour mixer and accordingly the functions of these components will now be described in greater detail.

In the described embodiment, fog may be simulated in one or two forms, that is homogeneous and non-homogeneous. Homogeneous fog is assumed to be of uniform density throughout world space, whereas non-homogeneous fog has a density which varies between parallel strata, the strata extending notionally to infinity. The strata could be horizontal (in world space) to simulate ground-level fog, or vertical to enable simulation of fog banks spaced apart along a runway, or inclined to the horizontal and vertical.

As indicated above, the transmittance of fog (Tfog) may be represented as:

$$Tfog = e^{-sr}$$

The derivation of sigma is not fundamental to the present invention but it is known that its value depends on contrast ratios and obscuration distances. One often accepted definition for sigma is 3/MOR, where MOR is the meterological optical range, that is the range at which a high contrast object is just visible. This is represented as the final perceived colour of the object being 5% of the true colour of the object and 95% fog colour.

Given an object of colour Rn, Gn, Bn, and a fog of colour Rf, Gf, Bf, then, assuming that all wavelengths are absorbed equally, the resultant colour Rd, Gd, Bd at range r will be:

$$Rd = Tfog \times Rn + (1 - Tfog) \times Rf$$

$$Gd = Tfog \times Gn + (1 - Tfog) \times Gf$$

$$Bd = Tfog \times Bn + (1 - Tfog) \times Bf$$

It is this resultant colour, calculated in the colour mixer, that must contribute to the final display. If only homogeneous fog is to be simulated, sigma may simply be looked up from the attribute store. It is then necessary to calculate range r.

Figure 5:
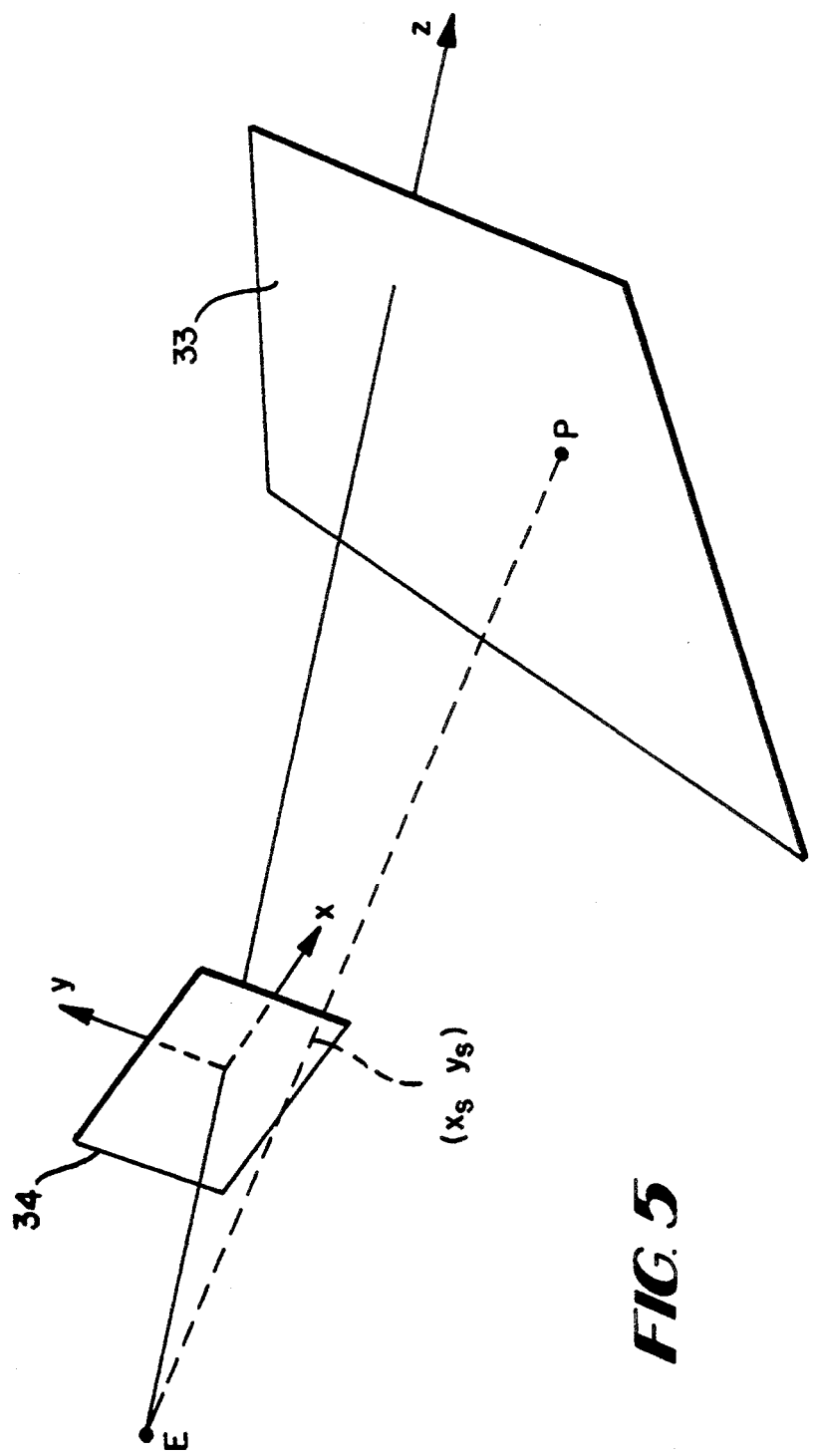
FIG. 5 illustrates the calculation of the distance of a feature from the eyepoint in the described embodiment of the present invention.

Referring to FIG. 5, this illustrates the calculation of range r for a point P on a four-sided polygon 33. The polygon is viewed through a viewing plane 34 from eyepoint E. The z axis extends from the eyepoint through the centre of the viewing plane. The point P is on a line drawn through a sampling point having screen space coordinate $(x_s, y_s)$.

The transformation engine of FIG. 2 will have transformed the world space geometrical attributes of the polygon into eyepoint space in a conventional manner. As a result the plane equation coefficients of the polygon will be available from the attribute store, and thus the eyepoint space coordinates $(x_p, y_p, z_p)$ of the point P can be calculated from:

$$z_p = -D/(Ax_s/d_x + By_s/d_y + C)$$

where:
A, B, C and D are the plane equation coefficients
$d_x$ and $d_y$ are functions of the half angle of the display
$x_s, y_s$ are the screen space coordinates of point P.

The x and y coordinates in eyepoint space can be readily calculated from:

$$x_p = z_p x_s/d_x \quad y_p = z_p y_s/d_y$$

The range r may be derived from:

$$r = \sqrt{x_p^2 + y_p^2 + z_p^2}.$$

The use of this equation in real time would be unrealistic and accordingly a slant range correction factor (srcf) is calculated where:

$r = z_p \cdot \text{srcf}$ $$\text{srcf} = \sqrt{1 + (x_s/d_x)^2 + (y_s/d_y)^2}$$

Thus the calculation of the range for any point corresponding to particular screen space coordinates has been described. In the illustrated system, the inverse range is initially calculated at each corner of each pseudocell and the inverse range at a particular pseudopixel centre is derived from the pseudocell corner inverse ranges by interpolation as described below.

In the case of homogeneous fog, Tfog is readily derived once the range has been calculated. In the case of non-homogeneous fog, it is necessary to consider the position and density of each of the series of fog strata and the path length therethrough, and to sum the effects. This is achieved by calculating an average value for sigma for the path through the strata, and then applying the above exponential relationship between transmittance, sigma and transmission distance.

Figure 6:
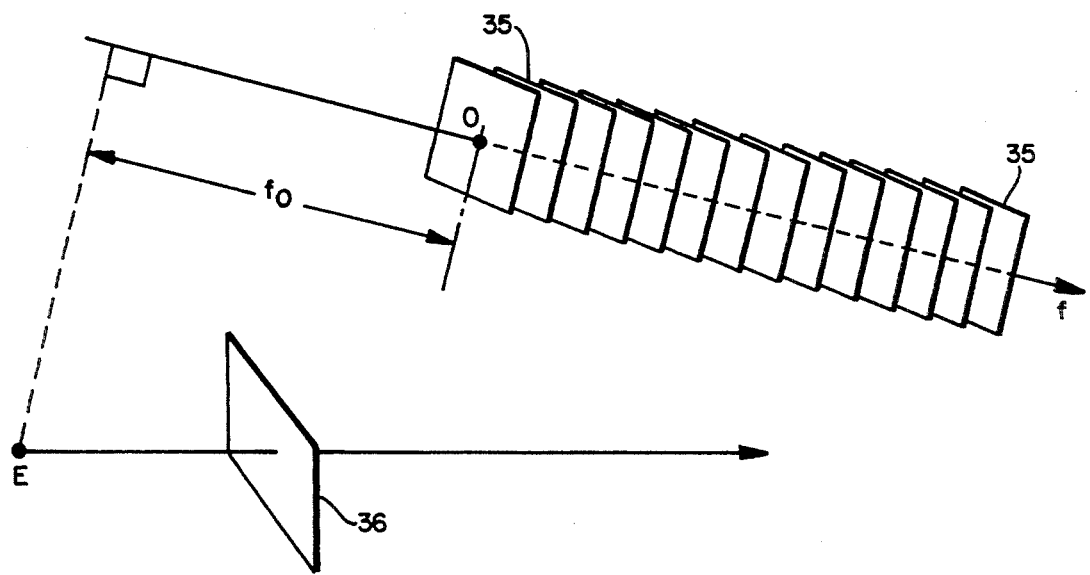
FIG. 6 illustrates a non-homogeneous fog formation modelled in accordance with the present invention.

The generation of an average value for sigma in the case of non-homogeneous fog will now be described. Referring to FIG. 6, this illustrates a non-homogeneous fog profile in which fourteen layers or strata of fog are indicated by quadrilateral 35. Each fog strata will in fact extend to infinity but for the purposes of illustration the location of each strata is indicated by the respective superimposed quadrilateral. Typically each fog profile will be made up from 1024 strata, the strata representing samples of the fog density at intervals of sixteen feet, but again for the purposes of illustration only fourteen strata are shown. The fog structure has an origin O, having eyepoint space coordinates $(x_0, y_0, z_0)$, and a direction vector f. Point E represents the eyepoint, and quadrilateral 36 the viewing screen. A line through the eyepoint E perpendicular to the fog axis f intersects that axis at a distance $f_0$ from the fog origin O.

The transformation engine (FIG. 2) receives from the system manager the following data:

a. A fog table made up from 1024 values of sigma sampled at sixteen foot intervals along the fog axis:

b. Fog origin coordinates in world space coordinates; and c. A fog axis direction vector in world space.

This data is processed in the object processor of the transformation engine as follows:

a. The fog origin is transformed from world space coordinates to eyepoint space coordinates to yield $(x_0, y_0, z_0)$;

b. The fog axis vector is transformed into eyepoint space to yield vector f with components $(f_x, f_y, f_z)$ c. The eyepoint space vector components are divided by screen z to yield $(f'_x, f'_y, f'_z)$, where:

$f'_x = f_x/d_x$
$f'_y = f_y/d_y$
$f'_z = f_z$ d. The eyepoint space position relative to the fog origin along the fog axis is calculated to yield $f_0$, where:

$$f_0 = -(E0 \cdot f)$$
$$= -(f_x x_0 + f_y y_0 + f_z z_0)$$

Figure 7:
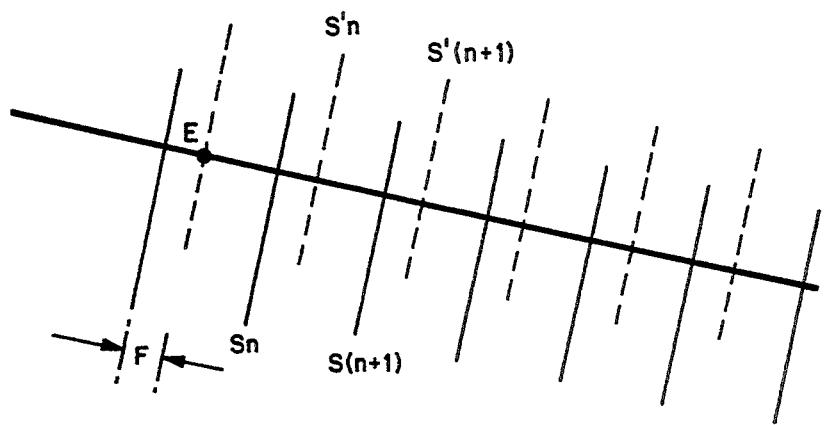
FIGS. 7 and 8 illustrate resampling of the fog structure with reference to the eyepoint.

The position of the eyepoint relative to the fog strata has thus been established using simple transformation techniques. To enable an accurate calculation of the average sigma through the strata the fog structure is then effectively resampled at strata having the same spacing as the original strata but displaced such that the eyepoint lies on one of the resampled strata. This is illustrated in FIG. 7, in which the original fog strata are indicated by full lines having sigma values of s(n), s(n+1) etc. and resampled strata planes are indicated by broken lines having sigma values of s'(n), s'(n+1) etc. It will be noted that the eyepoint E is between two of the original strata planes but lies on one of the resampled strata planes. The resampled sigma values are derived from:

$$s'(n) = F\, s(n+1) + (1-F)s(n)$$

where
s'(n) is the nth resampled sigma value
s(n) is the original sigma value
F is the fractional part of $f_0$.

Figure 8:
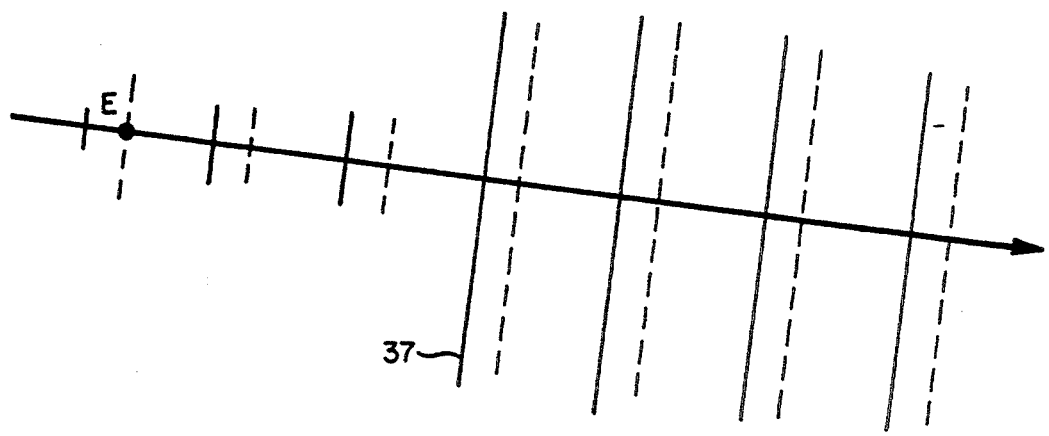

In FIG. 7, it is assumed that the eyepoint lies within the fog structure. FIG. 8 illustrates the case in which the eyepoint lies outside the fog structure. In FIG. 8, the full line 37 represents one edge of the fog structure, that is the stratum of the fog structure nearest to the eyepoint E. In a case such as that illustrated in FIG. 8, the structure is again resampled, the fog structure being effectively extended to the eyepoint with sigma values beyond the structure equal to the sigma value at the edge of the structure.

Figure 9:
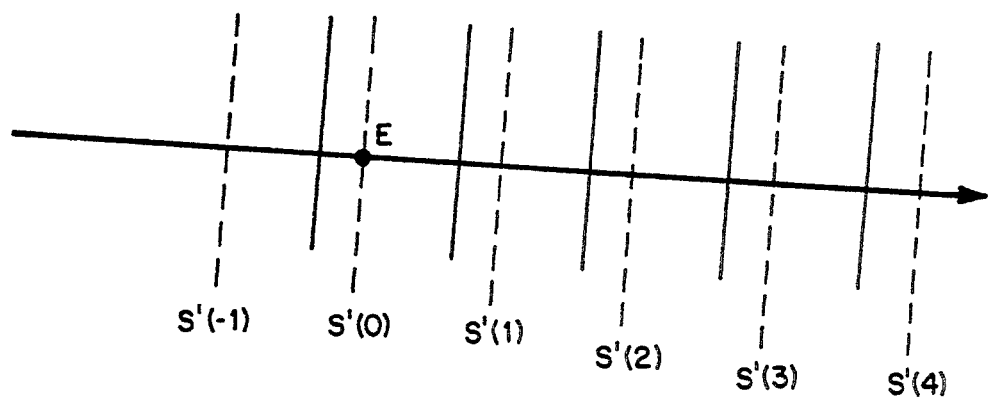
FIG. 9 illustrates the calculation of average sigma values in general terms.

For each resampled plane, the average value of sigma between that plane and the eyepoint is calculated from:

$$s_{av}(n) = [1/(n+1)] \sum_{m=0}^{m=n} s'(m)$$

where $s_{av}(n)$ is the average value of sigma and the eyepoint E lies on the plane corresponding to n=0 as illustrated in FIG. 9.

If either the eyepoint or the object to be viewed are outside the fog structure (e.g., as illustrated in FIG. 8), or the eyepoint and the object are either side of the fog structure, the fog structure is notionally extended out to the eyepoint or object or both with the extended strata having sigma values equal to that of the original stratum nearest to the eyepoint or object. In order for the extended average signa values to be correct, the sigma values at the edge of the fog structure are reduced smoothly towards a zero value at the edge of the fog structure.

In the case of the embodiment described above, it would be possible to compute a non-homogeneous fog effect output for each of eight sampling points in each of sixteen pseudopixels in each pseudocell in turn. To reduce the computational load however, it is preferred to calculate a single fog output for each pseudopixel centre and to allocate that output to each sampling point within the pseudopixel. The sigma average values are calculated as described above in the transformation engine once per field and distributed to the rendering engine for storage in a look-up table. The calculated sigma values are used in the special effects module to generate a fog modulation output signal for use in the colour mixer.

In detail, the special effects module performs the following functions:

a. For each feature under consideration, e.g. a polygon, the value is calculated of the fog table address at each corner of each display cell to which the feature contributes to yield:

$$f_{c1j} = (f'_x \cdot x_s + f'_y \cdot y_s + f'_z)z - f_0$$

where $(f'_x, f'_y, f'_z)$ is the scaled fog axis vector calculated in the transformation engine as described above.

$f_0$ is the eyepoint position relative to the fog axis calculated in the transformation engine as described above $(x_s, y_s)$ are the screen space coordinates of the display cell corners (note that a display cell is the four by four array of pixels overlapped by a single pseudocell and that adjacent display cells have coincident corners).

b. Having derived $f_{c1j}$, a bilinear interpolation is performed to yield sixteen values $f_{1j}$ for fog table addresses at the centres of all sixteen pseudopixels making up the pseudocell overlapping the respective display cell.

c. The value of sigma average corresponding to each pseudopixel centre is formed by looking up the fog table and interpolating between the entries in two adjacent fog table addresses. Essentially, the fog table addresses correspond to respective distances from the eyepoint. If the feature under consideration is outside the fog structure, the address is clamped to the maximum extent of the fog structure. Thus:

$$s = (s_{av})_f \cdot (1-F) + (s_{av})_{f+1} \cdot F$$

where

F is the fractional part of the fog table address f f and f+1 are the two adjacent addresses d. The transmittance is calculated from:

$$T_{fog} = e^{-sr}$$

where r is the range to the pseudopixel centre s is the sum of homogeneous and average non-homogeneous sigmas r is calculated from the slant range correction factor as:

r=z . srcf e. The calculated transmittance $T_{fog}$ at, each pseudopixel centre is transmitted to the colour mixer.

Figure 10:
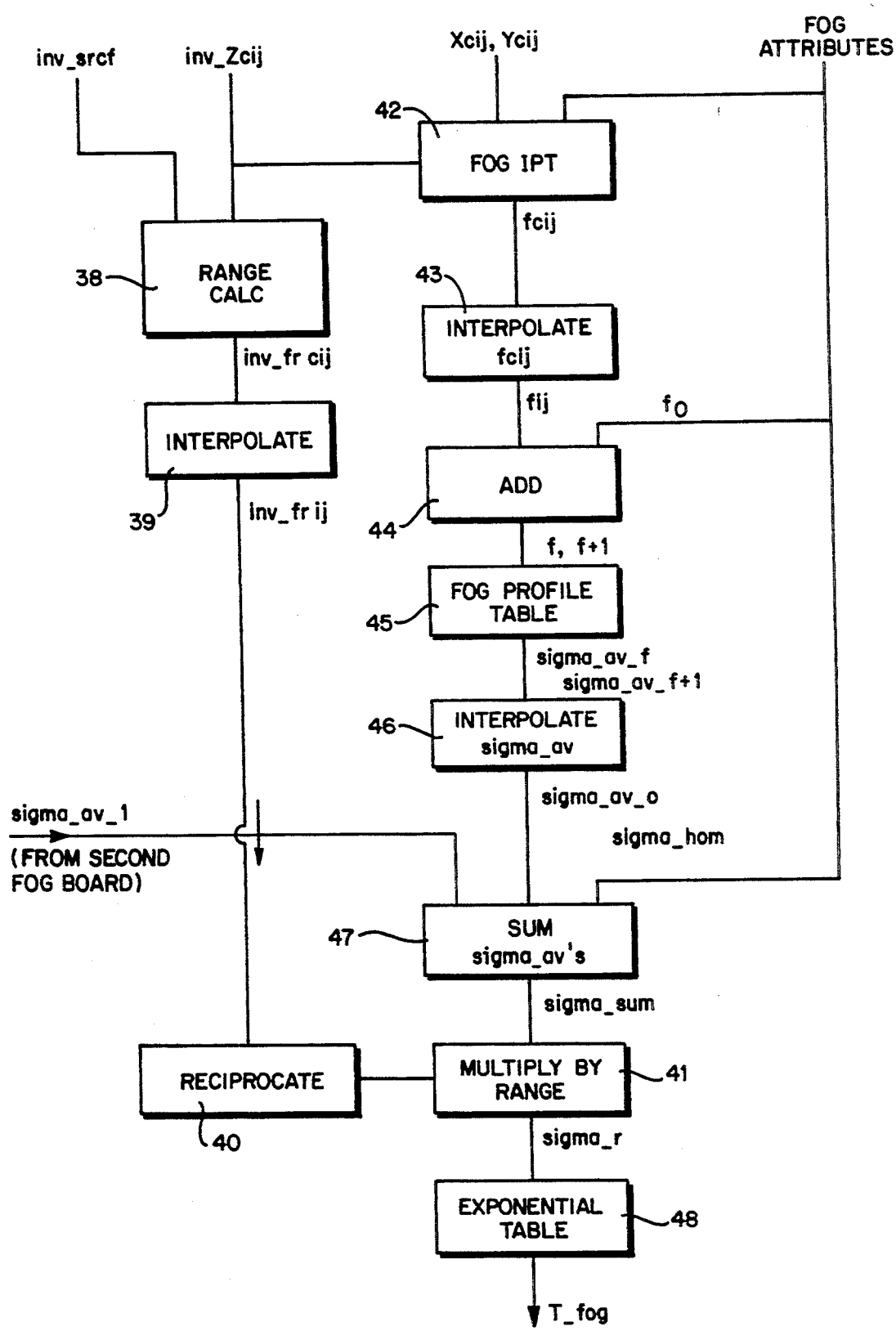
FIG. 10 is a schematic illustration of the structure of a non-homogeneous fog processor in accordance with the present invention.

The operational structure of the fog processing components of the special effects module are illustrated in FIG. 10. Fog attributes (both homogeneous and non-homogeneous) are received once per field before processing of the fog begins. The same fog attributes are processed for every fragment.

Inverse z at the display cell corners and inverse slant range correction factor (srcf) are supplied to a range calculator 38 which produces an inverse a range output corresponding to each corner. An interpolator 39 interpolates the inverse range for each pseudopixel centre and provides an output to a reciprocator 40. This provides a range output to a multiplier 41.

The geometrical fog attributes, that is the fog axis (perpendicular to strata) and origin, have already been transformed into eyepoint space. An inverse perspective transformation device 42 processes the non-homogeneous fog attributes in conjunction with the pseudocell coordinates and the inverse z values to produce fog profile addresses at the pseudocell corner. An interpolator 43 then produces sixteen fog profile addresses, one for each pseudopixel centre. $f_0$ is then introduced via adder 44 and two fog profile addresses are produced, f and (f+1).

Fog profile table 45 has been loaded with the appropriate sigma average values and the two addressed values are read out to an interpolator 46. A linear interpolation of the two addressed sigma average values is conducted, controlled by a function of the position relative to the fog profile of the point on the feature being considered, that is the fractional part F of the fog table address, in order to produce a smooth transition across the strata. This produces a final sigma average for one non-homogeneous fog structure. This is then added to sigma for any homogeneous fog and any sigma average for other non-homogeneous fog structures in an adder 47. The sum of the sigmas is then multiplied with range in multiplier 41 and then applied to an exponential look-up table 48 to produce a final Tfog output. This is then applied as described above in connection with simple homogeneous fog, that is the colour mixer (FIG. 4) then modifies the features colour in accordance with the equations:

$$Rd = T \cdot Rn + (1-T) Rf$$

$$Gd = T \cdot Gn + (1-T) Gf$$

$$Bd = T \cdot Bn + (1-T) Bf$$

where (Rd, Gd, Bd) is the resultant colour (Rn, Gn, Bn) is the original colour (Rf, Gf, Bf) is the fog colour.

The above description assumes that the feature in question is a polygon. Light points can also be processed, the range for the light point centre being calculated and substituted for the four range outputs corresponding to each corner of the display cell which are calculated when a polygon is being considered. In other respects, fog processing is similar for light points as for polygons.

Thus the described system provides the ability to simulate particular common fog effects and to combine various different fog effects to produce complex combined fog effects. The computational load is within the capacity of current image generator systems. The invention thus makes possible the simulation of realistic fog effects in real time systems.

I claim:

1. A method for simulating the effects of non-homogeneous fog in an image displayed on a screen, the image being intended to represent the appearance of a model defined in a database in world space coordinates from an eyepoint position in said world space coordinates, and the model being defined in terms of a plurality of features having predetermined attributes, said method comprising the following steps:

a) defining a non homogeneous fog structure in world space coordinates as a series of parallel strata of predetermined extinction coefficients, b) determining a position relative to the defined parallel strata of the eyepoint, c) determining a position relative to the defined parallel strata of a feature which may contribute to the image, d) determining a distance from the eyepoint to the feature, e) calculating an average value of the extinction coefficient between the eyepoint and the feature from the defined parallel strata located between the eyepoint and the feature, f) modulating said attributes as a function of said distance and a calculated average value of the extinction coefficient, the average value of the extinction coefficient between the eyepoint and the feature being calculated by:

calculating and storing average extinction coefficient values for each of a series of distances from the eyepoint in a direction perpendicular to the parallel strata, calculating the distance from the eyepoint to the feature in the direction perpendicular to the parallel strata, and looking up the stored average extinction coefficient corresponding to said distance from eyepoint to feature, the non-homogeneous fog structure being defined in the model by a series of sample extinction coefficients, each corresponding to the extinction coefficient at a respective one of a series of parallel equally spaced sample planes, the non-homogeneous fog structure being redefined with reference to the eyepoint by a series of average extinction coefficients each corresponding to the average extinction coefficient between the eyepoint and a respective resample plane, the resample planes being parallel to and equally spaced to the said sample planes and one of the resample planes passing through the eyepoint, and each resampled average extinction coefficient being stored at an address corresponding to a distance from the eyepoint to the resample plane to which that coefficient is related.

2. A method according to claim 1, wherein average extinction coefficients are looked up corresponding to two resample planes between which the feature is located, and a further average extinction coefficient is calculated by interpolating the looked-up coefficients with reference to the position of the feature relative to the said two resample planes.

3. A method according to claim 2, wherein screen space is divided into a plurality of cells each covering a plurality of pixels, and wherein, for each feature, said method comprises:

calculating addresses of the resample planes for points defined by the intersection between lines drawn from the eyepoint through the corners of the cells and a plane defined by the feature, and calculating the resample plane addresses for each of a series of sampling points of the feature by interpolation from the cell corner resample plane addresses.

* * * * *